United States Patent [19]

Scavone

[11] Patent Number: 5,470,598
[45] Date of Patent: Nov. 28, 1995

[54] BETA-PRIME STABLE LOW-SATURATE, LOW TRANS, ALL PURPOSE SHORTENING

[75] Inventor: Timothy A. Scavone, Maineville, Ohio

[73] Assignee: The Procter & Gamble Company, Cincinnati, Ohio

[21] Appl. No.: 216,393

[22] Filed: Mar. 23, 1994

[51] Int. Cl.$^6$ .................................................. A23D 9/00
[52] U.S. Cl. ............................................ 426/607; 426/601
[58] Field of Search .................................... 426/606, 607

[56] References Cited

U.S. PATENT DOCUMENTS

| | | | |
|---|---|---|---|
| Re. 33,996 | 7/1992 | Jandacek | 514/23 |
| 1,389,947 | 9/1921 | Hechler | 426/606 |
| 2,174,365 | 9/1939 | Gudheim | 426/607 |
| 2,521,219 | 9/1950 | Holman et al. | 99/118 |
| 2,521,242 | 9/1950 | Mitchell | 99/118 |
| 2,521,243 | 9/1950 | Mitchell | 99/128 |
| 2,909,432 | 10/1959 | Linteris | 99/118 |
| 3,253,928 | 5/1966 | Bedenk et al. | 99/139 |
| 3,360,376 | 12/1967 | Dobson | 99/118 |
| 3,397,997 | 8/1968 | Japikse | 99/118 |
| 3,425,842 | 2/1969 | Japikse | 99/122 |
| 3,425,843 | 2/1969 | Japikse | 99/144 |
| 3,595,673 | 7/1971 | Seiden | 426/607 |
| 3,597,230 | 8/1971 | Colby et al. | 99/122 |
| 3,600,186 | 8/1971 | Mattson et al. | 99/1 |
| 3,637,402 | 1/1972 | Reid | 426/474 |
| 3,706,578 | 12/1972 | Bence | 99/118 R |
| 3,857,985 | 12/1974 | Reid et al. | 426/362 |
| 4,049,839 | 9/1977 | Luddy | 426/608 |
| 4,130,572 | 12/1978 | Luddy | 426/608 |
| 4,341,812 | 7/1982 | Ward | 426/603 |
| 4,341,813 | 7/1982 | Ward | 426/603 |
| 4,366,181 | 12/1982 | Dykshoorn | 426/607 |
| 4,486,457 | 12/1984 | Schijf | 426/607 |
| 4,501,764 | 2/1985 | Gercama | 426/607 |
| 4,791,000 | 12/1988 | Holemans et al. | 426/606 |
| 4,919,964 | 4/1990 | Adams et al. | 426/606 |
| 4,996,074 | 2/1991 | Seiden et al. | 426/601 |
| 5,064,670 | 11/1991 | Hirshorn et al. | 426/607 |
| 5,104,678 | 4/1992 | Yang | 426/601 |
| 5,169,670 | 12/1992 | Yang | 426/601 |
| 5,194,281 | 3/1993 | Johnston et al. | 426/531 |
| 5,215,779 | 6/1993 | Dake | 426/601 |
| 5,288,512 | 2/1994 | Seiden | 426/607 |

FOREIGN PATENT DOCUMENTS 2208079  2/1989  United Kingdom ................. 426/606

OTHER PUBLICATIONS

Madison et al., "*Accurate Determination of Trans Isomers in Shortening and Oils by Infrared Spectrophotometry*", J. Amer. Oil Chem. Soc., vol. 59, No. 4 (Apr., 1982), pp. 178–181.

Coppen, P. P., "*The Use of Antioxidants*", Rancidity in Foods, Applied Science Publishers, J. C. Allen and R. J. Hamilton, eds., (1990), Chapter 5, pp. 67–69.

Gordon, M. H., "*The Mechanism of Antioxidant Action in vitro*", Food Antioxidants, Elsevier Applied Science, publisher, B. J. F. Hudson, ed., (19830, pp. 4–19, 105).

*Primary Examiner*—Carolyn Paden
*Attorney, Agent, or Firm*—Rose Ann Dabek; J. C. Rasser

[57] ABSTRACT

A beta prime stable plastic shortening exhibiting superior baking and frying performance and containing reduced levels of saturates and trans fatty acids is disclosed. The shortening is particularly useful in confectionery, baking, and frying applications. The plastic shortening of the present invention comprises from about 6% to about 25% by volume, of an inert gas and from about 75% to about 94% by volume of a fat phase comprising:

a) from about 74% to about 90% by weight of a base oil having less than 10% by weight of trans fatty acids, less than 16% $C_4$–$C_{26}$ fatty acids, b) from about 10% to about 20% by weight of a beta prime stable crystalline hardstock consisting essentially of at least 65% of PSP and PSS, wherein the ratio of PSP:PSS is at least 0.8 to 1.0 and from 0 to 30% other triglycerides or synthetic fats and from 0 to 5% monoglycerides or diglycerides The plastic shortening can optionally contain from about 25 ppm to about 500 ppm added antioxidant and/or from about 1% to about 8% of an emulsifier. From about 0.05% to about 3% additional ingredients can also be added to said plastic shortening. The plastic shortening of the present invention has a finished shortening penetration of from about 160 mm\10 to about 275 mm/10 and a maximum gas bubble size of less than 1 mm.

20 Claims, No Drawings

BETA-PRIME STABLE LOW-SATURATE, LOW TRANS, ALL PURPOSE SHORTENING

BACKGROUND OF THE INVENTION

Plastic shortenings am generally produced by thermal and mechanical treatment of several components. In conventional plastic shortenings, lightly and intermediate hydrogenated vegetable oils are blended with fully hydrogenated oils (hardstock) in varying proportions to produce a product which is approximately 85% oil and 15% solid at room temperature. The quality and texture of shortenings depend on incorporated gas, plasticity, consistency and solid to liquid ratio. The crystal phase of the fats used and the method of preparation affect these physical characteristics.

Although the beta (B) phase crystalline form of triglyceride is more thermodynamically stable than the beta prime (B') crystalline phase, plastic shortenings having a solid phase predominantly in the B' form are usually used because B shortenings tend to have a soupy, highly fluid consistency and/or a translucent appearance. It is well known in the art that B' crystals, if present, have the capacity to form a rigidly interlocking structure when suspended in a liquid component at sufficient concentration. However, plastic shortenings containing intermediate melting B' solid triglycerides are noticeably deficient in their ability to withstand storage at temperatures ranging from 90–100° F. (32° C.–38° C.) for periods of about 1–3 months without appreciable change in their performance and appearance. Some B' plastic shortenings firm excessively and thus become difficult to blend with other constituents in normal food recipes. Shortening blends of vegetable oils and fat derived from animals are B' phase plastic shortenings. These shortenings are also high in saturates and tend to be firm. Because both the B plastic shortening and B' plastic shortening lack desired features, a compromise is often made in preparing conventional plastic shortenings. Generally shortenings crystallized in the B' phase are preferred because of their uniform product appearance and stability over varying temperature ranges.

Conventional plastic shortenings comprise intermediate-melting, partially hydrogenated semi-solid fat commonly called "intermediate-melting fat" dispersed in the liquid oil, an unhardened or partially hydrogenated liquid oil commonly called "base oil", and a fully hydrogenated solid fat commonly called "hardstock". In general, the method of attaining the B' crystal form desired for plastic shortenings is to use a suitable B' tending highly hydrogenated or saturated hardstock. Conventional B' tending hardstocks contain triglycerides that may undergo polymorphic transformations and crystal size changes on processing and storage and/or on temperature variations under stress conditions. This transformation results in a shortening which has a poor appearance, poor volume and poor performance. Further, the hydrogenation process causes trans-isomeric forms of the mono and polyunsaturates to form. There is some concern that trans isomers and saturated fats in the diet may be linked to high levels of cholesterol in the blood (hypercholerolemia).

The use of vegetable oils and margarine for cooking and baking are thought to be an effective means for lowering dietary intake of saturated fats and trans fatty acids. A typical vegetable oil has about 2.0 grams of :saturates and 0 grams of trans per serving. Conventional margarine contains about 2.0 grams of saturated fat and 2.5 grams of trans fatty acids per serving as compared to vegetable plastic shortenings which typically contain from about 2.5 to about 3.5 grams of saturated fat and from about 2.0 to about 2.5 grams of trans fatty acids per serving. While vegetable oils and margarines are desirable from a health aspect, vegetable oil is often less desirable for baking due to lack of performance, e.g. "poor creamability". Margarines are less desirable for frying. In pan frying, margarines brown and bum, and in deep frying they are totally unusable. The browning is due to the reaction of the protein and sugars required by the margarine standard of identity.

Low trans isomer fat products (e.g., certain margarines and shortenings) are generally formed from a blend of interesterified fats, unsaturated vegetable oils, saturated vegetable oils and mixtures thereof. While these processes produce a low trans fat product, the product is often high in saturated fats. Other methods focus on reducing the saturated fat levels by utilizing the trans-isomer content of the unsaturated fatty acids to provide functional solids for the shortening or margarine.

An alternative product was made using an unhydrogenated base oil low in saturates and low in trans, a mixture of a B tending hardstock and a B' tending hardstock having an IV of less than 10, an antioxidant, an emulsifier and an inert gas. A unique processing method was required to make an effective baking and frying shortening. This shortening had reduced levels of saturates and trans fatty acids. This was accomplished predominantly by reducing the level of trans fatty acids and saturates in the base oil by using an unhydrogenated base oil and an antioxidant, which provides oxidative stability, a highly efficient structuring system and high levels of inert gas dispersed in the shortening. The B' tending hardstock is responsible for obtaining the desired B'-like behavior even though the shortening is in the B phase. The B tending hardstock stabilizes the shortening in the B phase. A hydrogenated high erucic acid rapeseed hardstock was used in this product. However, this shortening had several performance negatives. It crystallized or solidified too fast, leaving a residue of fat in the frying pan as it cooled. The melting point was too high, when baking cookies, cookie spread and browning were reduced, and the shortening texture was not optimal. When making pie crests and cookie doughs, the shortening thinned excessively during mixing.

Surprisingly, it was found that these: problems are eliminated by using a B' hardstock that is a triglyceride of palmitic and stearic acid consisting essentially of at least 65% of PSP and PSS, wherein the ratio of PSP:PSS is at least 0.8 to 1.0 and from 0 to 30% other triglycerides or synthetic fats and from 0 to 5% monoglycerides or diglycerides. PSS and PSP are defined below.

It is therefore an object of the present invention to provide a low saturate, low trans, B' stable plastic shortening suitable for use in preparation of a broad range of applications consisting of, but not limited to shortenings, peanut butter stabilizers, cosmetics, confections, frostings, baked goods, prepared cake mixes and margarine.

It is also the object of the present invention to provide a B' stable plastic shortening exhibiting superior product appearance, texture, and stability, and to provide a method for its preparation.

It is also the object of the present invention to provide a B' stable plastic shortening having a uniform consistency and which does not have a tendency to firm over a wide range of temperatures, which is stable to temperature cycling, and which does not solidify too rapidly or shear thin excessively.

Another object of this invention is to provide a method of preparation of a low saturate, low trans, plastic shortening having the above described characteristics.

These and other objects will become apparent from the following detailed description. All percentages hereto are by weight unless otherwise specified.

SUMMARY OF THE INVENTION

The present invention is directed to a B' plastic shortening which has a reduced level of saturates and trans fatty acid isomers comprising:

(1) from about 6% to about 25%, preferably from about 8% to about 23%, most
preferably from about 10% to about 20% by volume of an inert gas;

(2) said fat phase consists essentially of:
  a) from about 74% to about 90%, preferably from about 80% to about 90% of an edible oil; said edible oil having from 0% to about 10%, most preferably from 0% to about 8% trans fatty acid isomers, and less than 16% saturated fatty acids, preferably less than 10% saturated fatty acids and preferably at least 0.01% normally occurring tocopherol;
  b) from about 10% to about 20%, preferably from about 11% to about 16% of a beta prime hardstock consisting essentially of: of at least 65% of PSP and PSS, wherein the ratio of PSP:PSS is at least 0.8 to 1.0, from 0 to 30% other triglycerides or synthetic fats and from 0 to 5% monoglycerides or diglycerides; and optionally, (3) from about 25 to about 500 parts per million (hereinafter "ppm") antioxidant, preferably at least about 50 ppm but no more than about 300 ppm;

(4) from about 1% to about 8%, preferably from about 1% to about 6% of a B' stable emulsifier having from about 2:5% to about 95%, preferably from about 30% to about 95% monoglyceride.

Conventional processing is used for making the low saturate, low trans B' stable plastic shortening

DETAILED DESCRIPTION

The present invention relates to a B' stable plastic shortening. The term "plastic" as used herein is utilized to designate a shortening product which appears to be solid at room temperature.

The term "fat" as used herein is intended to include all edible, fatty acid triglycerides regardless of origin or whether they are solid or liquid at room temperature. Thus, the term "fat" includes normally liquid and normally solid vegetable and animal fats and oils. The term "oil" as employed herein, is intended to refer to those fats which are liquid in their unmodified state. Natural and synthetic fats and oils are included in these terms.

The term "beta prime" or "B'" as used herein defines an overall tendency of certain triglyceride solids to crystallize and remain stable for the most part m a beta prime phase. This does not mean, however, that under proper conditions, triglyceride solids cannot be transformed from B' phase to B phase. The types of polymorphic crystalline structures of fats can be identified by their X-ray diffraction patterns and are described in U.S. Pat. Nos. 2,521,241 and 2,521,242 granted to Paul J. Mitchell, Jr., Sep. 5, 1950.

The term "edible oil" or "base oil" as used herein refers to an oil which is substantially liquid at room temperature and has an IV of greater than 70, more preferably greater than 90. The base oil can be unhydrogenated oil or partially hydrogenated oil, modified oil or mixtures thereof.

The term "PSP" as used herein refers to a triglyceride of palmitic and stearic acid wherein the palmityl groups occupy the 1 and 3 positions and the stearyl group is in the 2 position. Similarly, the term "PSS" refers to a triglyceride of plamitic and stearic acid wherein the palmitic acid is in the 1 or 3 position and two stearic acids occupy the 2 and remaining terminal or 1,3 position.

The term "saturates", "saturated fat", and "saturated fatty acids" as used herein refer to $C_4$ to $C_{26}$ fatty acids or esters containing no unsaturation unless otherwise indicated.

The term "trans", "trans fatty acids", "trans isomers" and "trans isomers of fatty acids" as used herein refer to fatty acids and/or esters containing double bonds in the trans configuration usually resulting from hydrogenation or partial hydrogenation of a fat. A method suitable for measuring the trans isomers of the present invention and the components therein is described by Madison, et al. in "Accurate Determination of Trans Isomers in Shortening and Oils by Infrared Spectrophotometry", in J. Amer. Oil Chem. Sec., Vol. 59, No. 4 (April, 1982), pp. 178–81, (herein incorporated by reference).

The term "iodine value" or "IV" as used herein refers to the number of grams of iodine equivalent to halogen adsorbed by a 100 gram sample of fat. This is a measure of the unsaturated linkages in a fat. The IV or a fat or oil can be determined by the AOCS Official Method Col. 1–25, also known as the,. Wijs method.

The term "serving size" as used herein refers to FDA regulation 21 CFR 101.9(b) and 21 CFR 101.12 (herein incorporated by reference).

The present invention relates to a low-saturate, low-trans B' stable plastic shortening which comprises: less than about 5 gm, preferably less than about 3 gm saturated fatty acids per serving; and from about 0 gm to about 1 gm, preferably less than 0.5 gm trans isomer content per serving.

THE COMPONENTS

Inert Gas

The product appearance, overall consistency and performance of a plastic shortening is partially due to the, bubble size of the inert gas dispersed in the shortening and partially due to the total amount of inert gas present in the shortening formula. A wide range of shortening consistencies and appearances are possible. However, incorporating large volumes of inert gas may cause a poor structure and a Swiss cheese appearance. The cheesy appearance is caused primarily by the coalescence of gas bubbles, which create "voids" or "pockets" of gas in the plastic shortening. An inert gas is used to control product consistency and to reduce the amount of saturates and trans fatty acids present in the total volume of the plastic shortening. It is preferable to incorporate from about 6% to about 25%, preferably from about 8% to about 23%, most preferably from about 10% to about 21% by volume nitrogen into the shortening. In addition to nitrogen, argon, helium, carbon dioxide and mixtures of these gases can be used. Vegetable shortenings typically contain from 10–12% nitrogen by volume and may be firm or soft and creamy in their blendability characteristics. Plastic shortenings made from meat fats may contain up to 22% nitrogen by volume, however, they are very firm and difficult to blend. Controlling the freezing and crystallizing process produces a vegetable shortening with an inert gas level as high as 18 to 20% that performs as well as shortenings with lower inert gas levels and is soft and easy to blend. The products have a smooth, creamy appearance with no Swiss cheese appearance.

Base Oil

The B' plastic shortening contains from about 74% to about 90%, preferably from about 80% to about 90% of an edible oil (hereinafter referred to as "base oil"). The base oil has an IV of above 70 preferably more than 90, and most preferably from about 90 to about 120 and is substantially liquid at room temperature. Base oil is an unhydrogenated or partially hydrogenated oil which has no more than about 16% $C_4$–$C_{26}$ saturated fatty acids and has no more than about 10% trans fatty acids. Preferably the base oil has less than 10% and most preferably less than 8% saturated fatty acids.

Refined and bleached canola oil and high oleic acid sunflower seed oil having less than 2% trans isomers of fatty acids are preferred base oils. Trans isomers in the base oil contribute to total trans level in the plastic shortening Refined and bleached canola oil is particularly suitable because it has a low level of saturated fatty acids, requires no hydrogenation, and has a low level of trans-isomers of unsaturated fatty acids. The source of oils and/or method used to make the base oil are not important, so long as the base oil is an unhydrogenated or partially hydrogenated oil and has no more than about 16% saturated fatty acids, and preferably no more than about 2% trans isomers of unsaturated fatty adds. Of course, genetically bred, bioengineered or microbial source oils having the requisite characteristics would be suitable.

Other oils suitable for the purpose of this invention can be derived, for example from the naturally occurring liquid oils such as sunflower oil, soybean oil, olive oil, corn oil, peanut oil, safflower oil, high oleic sunflower oil, low linoleic canola oil, high oleic safflower oil, glycerol esters of purified fatty acid methyl esters, polyglycerol esters as long as saturates and trans isomers level an; within the preferred range and mixtures thereof. Also, suitable liquid oil fractions can be obtained from palm oil, lard, and tallow, for example, as by fractionation or by direct interesterification, followed by separation oft he oil.

The Hardstock

The plastic shortening also comprises from about 10% to about 20%, preferably from about 11% to about 16% hardstock which is solid at room temperature. Hardstock provides high temperature stability to the low saturate, low trans shortening. The hardstock comprises from about 10% to about 20%, preferably from about 11% to about 16% of a beta prime hardstock consisting essentially of: at least 65% of PSP and PSS, wherein the ratio of PSP:PSS is at least 0.8 to 1.0 and from 0 to 30% other triglycerides or synthetic fats and from 0 to 5% monoglycerides or diglycerides. Preferably, the level of PSP in the beta prime; hardstock is from 35% to about 98%, and most preferably PSP is present at from about 38% to about 80%. The level of PSS is preferably from about 2% to about 65%, and most preferably from about 10% to about 61%. The remaining synthetic or naturally triglycerides can be any compatible fat composition. Usually these materials will be the naturally occurring non-PSS and PSP materials found in the oil or fat from which the PSP and PSS are derived. It is most preferred that the beta prince hardstock not contain more than 3% mono and diglycerides of palmitic and stearic acid.

PSP is found in cottonseed stearine and hydrogenated cocoa butter, Phulwara butter, Chinese vegetable tallow and whole or fractionated palm oil which has been hydrogenated.

This beta prime tending hardstock preferably has an IV of less than about 10, preferably less than about 8.

Antioxidant

The edible base oil has a tendency to oxidize. Some oils contain a natural antioxidant and others are naturally stable to oxidation. For the naturally stable oils, it is not necessary to add an antioxidant. Preferably the base oil contains a total from about 25 to about 500 ppm, more preferably from about 50 to about 300 ppm of added antioxidant, but no more than about 500 ppm. It is important that the level of antioxidant be controlled. Some antioxidants provide increasing protection as the concentration increases. At higher levels some can act as prooxidants. A proper balance must be maintained between the quantity which provides maximum stabilization and that which participates in the chain reaction and thereby intensifies oxidation. The antioxidant allows the use of an unhydrogenated base oil in the formula.

The antioxidant tocopherol that is naturally present in the base oil at levels of about 0.01% or greater provides some oxidative stability to the plastic shortening. If the oil has been treated or processed to remove tocopherol, it can be added back at an effective level.

A wide variety of antioxidants are suitable for use, including but not limited to butylated hydroxytoluene (BHT), butylated hydroxyanisole (BHA), tertiary butylhydroquinone (TBHQ), ethylenediaminetetracetic acid (EDTA), gallate esters (i.e. propyl gallate, butyl gallate, octyl gallate, dodecyl gallate, etc.), tocopherols, citric acid, citric acid esters (i.e. isopropyl titrate, etc.), gum guaiac, nordihydroguaiaretic acid (NDGA), thiodipropionic acid, ascorbic acid, ascorbic acid esters (i.e. ascorbyl palmitate, ascorbyl oleate, ascorbyl stearate, etc.) tartaric acid, lecithin, methyl silicone, polymeric antioxidant (Anoxomer) plant (or spice and herb) extracts (i.e. rosemary, sage, oregano, thyme, marjoram, etc.) and mixtures thereof. The preferred antioxidant for use in the present invention is ascorbyl palmitate in combination with tocopherol.

Emulsifier

If desired, the product may contain small percentages of known B' compatible emulsifiers such as mono- and diglycerides, distilled monoglycerides, polyglycerol esters of $C_{12}$ to $C_{22}$ fatty acids, propylene glycol mono and diesters of $C_{12}$ to $C_{22}$ fatty acids, sucrose mono- and diesters of $C_{14}$ to $C_{22}$ fatty acids. Particularly suitable emulsifiers are mono- and triglycerides of partially hydrogenated soybean oil, or mixtures thereof. Such emulsifiers if added should be from about 1% to about 8% of the total shortening. Preferably, said emulsifier comprises a minimum of about 35% monoglycerides. Such emulsifiers can be effective at modifying certain properties of the low saturate, low trans shortening. The emulsifier influences the shortening's baking performance.

Additional Ingredient

From about 0.05% to about 3% of other ingredients such as flavoring and coloring can also be added to the shortening of this invention. These include butter flavors, meat or tallow flavors, olive oil flavors and other natural or synthetic flavors. Vitamins can also be included in the oil. Various other additives can be used in the shortening of the invention provided that they are edible and aesthetically desirable. It should be recognized, however, that the presence of other additives may have an adverse effect upon the stabilizing properties of the shortening of this invention and, therefore, the desirability of the use of other additives will depend upon the overall shortening qualifies desired.

Method of Preparation

There is no special apparatus or processing equipment needed. Conventional equipment may be used to process low-saturate, low trans, beta prime plastic shortening.

The processing is conventional and normally comprises the steps of:

(1) Fully melting and mixing said base oil, hardstock mixture, antioxidant and emulsifier at a temperature of from about 120° F. (48° C.) to about 180° F. (82° C.);

(2) injecting from about 6% to about 25%, preferably from about 10% to about 20% by volume of an inert gas under a pressure of from about 50 to about 700 pounds per square inch gauge (hereinafter "psig;") to form a shortening mixture;

(3) rapidly cooling said shortening mixture in a scraped surface heat exchanger to a temperature of from about 40° F. (4° C.) to about 70° F. (21 ° C.);

(4) agitating said shortening mixture in a picker box sufficiently to impart enough work input such that said shortening mixture has a finished shortening consistency of from about 160 mm/10 to about 270 mm/10 and a maximum inert gas bubble size of less than 1 mm;

(5) heating said shortening mixture in a scraped surface heat exchanger and placing into a suitable container; said shortening mixture having a filling temperature of from about 70° F. (21° C.) to about 92° F. (33° C.), preferably from about 75° F. (24° C.) to about 80° F. (27° C.);

(6) tempering said shortening at a temperature of from about 80° F. (27° C.) to about 110° F. (43° C.), preferably from at least about 80° F. (27° C.) to about 90° F. (32° C.) for at least about 24 hours;

It is critical to obtain the desired set-up rate in the process to prevent inert gas bubble coalescence. It is also important to provide enough work input to obtain the desired finished shortening penetration. These objectives can be achieved by increasing the mount of work input to soften the shortening (i.e., greater agitation in the picker box, high agitation from an extra scraped surface heat exchanger or other device to apply added work input) and by controlling the Picker Residence Time and/or decreasing the filling temperature to prevent nitrogen bubble coalescence.

The preferred method used to prepare the shortening and to obtain the necessary beta prime phase crystalline structure, is to heat the mixture of the base oil, hardstock blend, antioxidant and emulsifier, if desired, to a temperature from about 120° (49° C.) to about 180° F. (82° C.). The temperature must be at least above the melting point of its solid components to form a melt. From about 6% to about 25%, preferably from about 8% to about 23%, most preferably from about 10% to about 20% volume of an inert gas is injected into the melt under a pressure of from about 50 to about 700 psig. The shortening melt is passed through a scraped surface heat exchanger and rapidly cooled in less than about 60 seconds and preferably in less than about 30 seconds to a temperature of from about 40° F. (4° C.) to about 70° F. (21° C.) to initiate fat crystallization therein. The cooled mixture is then agitated in a picker box to impart enough work input such that said shortening mixture has a finished shortening consistency of from about 160mm/10 to about 275 mm/10 and an inert gas bubble size less than 1mm. This can usually be accomplished in from about 1 to about 8 minutes, preferably in about 3 to about 6 minutes.

The mixture is then heated in a scraped surface heat exchanger with variable revolutions per minute until the plastic shortening has a grease cone viscosity after 5 minutes of from about 100 to about 300 mm/10 to prevent nitrogen bubble coalescence. The grease cone viscosity is indicative of the ability of the shortening to temper to the appropriate finished shortening penetration. The finished shortening should have 180 to 275 mm/10 shortening penetration. A suitable method for determining finished shortening penetration is illustrated in the following reference, incorporated by reference herein: U.S. Pat. No. 4,996,074 to Seiden and White, (assigned to The Procter & Gamble Company), issued Feb. 26, 1991 (Tailored Beta-Prime Stable Triglyceride Hardstock).

The grease cone analysis is the same as the penetration analysis in the above-mentioned U.S. Pat. No. 4,996,074 except the precision cone 73525 was used. The cone weighs 35 grams, has a 2⅝ inch diameter and is 3⅛ inches in length. The grease cone penetration is measured about 5 minutes after filling the package. The shortening is heated to a filling temperature of from about 70° (21° C.) to about 95° F. (3° C.). The shortening is immediately put into suitable containers. The packaged shortening is then tempered at a constant temperature of from about 80° F. (27° C.) to about 100° F. (38° C.) for at least about 24 hours.

As previously stated, the low-saturate, low trans plastic B' shortening of the present invention uses conventional equipment. Said process can be varied by one skilled in the art to achieve the B' plastic shortening of the present invention.

Although the present invention has been described in considerable detail with reference to certain preferred versions thereof, the spirit of the scope of the appended claims should not be limited to the description of the preferred versions contained herein. Table 1 compares the shortenings made in Examples 1 and 2 with conventional shortenings in a stick or other form, e.g. Crisco shortening an all vegetable shortening manufactured by the Procter & Gamble Company.

EXAMPLE 1

Low Saturate, Low Trans Beta Prime Stable Shortening

A low saturate, low trans beta stable shortening having 2.20 grams of saturates and 0.15 grams of trans per serving and a penetration of 224 mm/10 is prepared as follows:

A 400 pound blend of shortening comprising 42.10 parts of refined and bleached unhydrogenated Canola Oil (with a chemical saturates level of 6.8%), 42.10 parts of refined, bleached and dewaxed High Oleic Sunflower Oil (a genetically bred sunflower oil with a chemical saturates level of 5.8%), 12.8% of Chocomate 1000® (a high POP mid fraction of palm oil manufactured by Intercontinental Specialty Fats SDN.BHD., an Associate Company Of Lain Malaysia & Walter Rau, W. Germany, P.O. Box 207, Port Klang, Selangor, Malaysia) was hydrogenated to an iodine value less than 10 to give a hardstock with 73.2% PSP in a ratio of FSP:PSS of 4.2:1 is prepared. This blend is deodorized at 450° F. (232° C.) in a batch deodorizer unit for two hours using moderate stripping steam levels and a vacuum of less than 8 mm Hg. To the deodorized mixture, 100 ppm of a 25% citric acid solution in water at about 300° F. (149° C.) is added while cooling the vessel. The mixture is then cooled to 160° F. (71° C.) and filtered through a one micron filter. To this cooled mixture 3.0 parts of mono and diglycerides (one such acceptable supply of this material is DUR.-EM 300 manufactured by Van Den Bergh Foods), and 100 ppm of Ascorbyl Palmitate, (manufactured by Hoffman-LaRoche) is added. This blend contains 18.8% chemical saturates and 1.3% trans isomers. The blend is placed in the finishing process melt tank where it was held at about 150°

F. (66° C.). A minor portion of batter flavors and color is added to the melt tank and allowed to mix for about an hour. The melted shortening is then continuously fed into the freezing process through a high pressure pump. Nitrogen at a level of about 12% by volume is injected prior to the pump and prior to entering the freezer. The pressure in the freezer is maintained above 300 psig. The shortening is then fed at a rate of 330 pounds per hour through two brine cooled "Votator" brand 3 inch by 12 inch scraped surface heat exchangers piped in series. The brine inlet temperature is maintained below 0° F. (−17.78° C.). The shortening mixture is cooled to a freezer outlet temperature of 50° F. (10° C.). The chilled stock then flows into a picker box. The picker box, manufactured by Votator (6 inch by 24 inch), operates at a shaft speed of 422 revolutions per minute (hereinafter "RPM") and contains 3 minutes of residence time. The time is key to work soften the shortening to improve its blendability and softness and to prevent inert gas bubble coalescence that may lead to a cheesy appearance. After exiting the picker box, the shortening is heated to a filling temperature of 80° F. (27° C.) through a Votator scraped surface heat exchanger using warm water at about 100° F. (38° C.). The shortening is passed through a slotted valve with a 0.040 inch (0.102cm) clearance where the pressure is lowered from about 310 psig to atmospheric pressure and filled into a preformed shortening stick package. The set up rate of the shortening is quick enough to prevent nitrogen bubble coalescence and the grease cone penetration was 204 five minutes after filling. The shortening is then allowed to temper in an 85° F. (29° C.) constant temperature room for 48 hours. After returning the shortening to 70° F. (21 ° C.) for two days, the appearance of the shortening and the penetration is measured. The texture and appearance are smooth and creamy. The onset of crystallization is 79.7 ° F. (26.5° C.). The viscosity of the structure after exposure to shear is 77.3 Pas.

EXAMPLE 2

Low Saturate, Low Tran Beta Stable Shortening

A low saturate, low trans beta stable shortening having 2.09 grams of saturates and 0.08 grams of trans per serving and a penetration of 202 mm/10 is prepared as follows:

A 400 pound blend of shortening comprising 65.0 parts of refined, bleached and dewaxed High Oleic Sunflower Oil (a genetically bred sunflower oil with a chemical saturates level of 5.8%), 20.0 parts of refined and bleached unhydrogenated Canola Oil (with a chemical saturates level of 7.1%), 9.0 parts of a high erucic acid rapeseed hardstock (hereinafter referred to as "HEAR hardstock") with a behenic acid level of 45% hydrogenated to an iodine value less than 10, and 4.5 parts refined and bleached Canola oil hydrogenated to an iodine value of less than 10 is prepared. This blend is deodorized at 450° F. (232° C.) in a batch deodorizer unit for two hours using moderate stripping steam levels and a vacuum of less than 8 mm Hg. To the deodorized mixture, 100 ppm of a 25% citric acid solution m water at about 300° F. (149° C.) is added while cooling the vessel. The mixture is then cooled to 160° F. (71° C.) and filtered through a one micron filter. To this cooled mixture 1.5 pans of distilled monoglycerides (one such acceptable supply of this material is Dimodan O manufactured by Grindsted) is added. This blend contains 19.2% chemical saturates and 0.7% trans isomers. The blend is placed in the finishing process melt tank where it was held at about 150° F. (66° C.). A minor portion of butter flavors and color is added to the hold tank and allowed to mix for about an hour.

The melted shortening is then continuously fed into the freezing process through a high pressure pump. Nitrogen at a level of from about 18%–20% by volume is injected prior to the pump and prior to entering the freezer. The pressure in the freezer is maintained above 300 psig. The shortening is then fed at a rate of 340 pounds per hour through two brine cooled "Votator" brand 3 inch by 12 inch scraped surface heat exchangers piped in series. The brine inlet temperature is maintained below 0° F. (−17.78° C.). The shortening mixture is cooled to a freezer outlet temperature of 50° F. (10° C.). The chilled stock then flows into a, picker box. The picker box, manufactured by Votator (6 inch by 24 inch), operates at a shaft speed of 410 revolutions per minute (hereinafter "RPM") and contains about 3 minutes of residence time. The time is key to allow the polymorphic phase to transition to occur, and to work soften the shortening to improve its blendability and softness. Allowing the phase to transition before exiting the process gives the shortening its glossy appearance and prevents inert gas bubble coalescence that may lead to a cheesy appearance. After exiting the picker boxes, the shortening is heated to a filling temperature of 80° F. (27° C.) through a Votator scraped surface heat exchanger using warm water at about 120° F. (49° C.). The shortening is passed through a slotted valve with a 0.040 inch (0.102 cm) clearance where the pressure is lowered from 360 psig to atmospheric pressure and filled into a can. The set up rate of the shortening is quick enough to prevent nitrogen bubble coalescence and the grease eerie penetration was 60 five minutes after filling. The shortening is then allowed to temper in an 85° F. (29° C.) constant temperature room for 48 hours. After returning the shortening to 70° F. (21° C.) for two days, the appearance of the shortening and the penetration is measured. The appearance is smooth and creamy. The bubble is less than 1 mm.

EXAMPLE 3

Low Saturate, Low Trans Beta Prime Stable Shortening

A series of bench top blends of low saturates and trans beta prime shortenings were made to compare the shear resistance, melting and solidification properties versus typical shortenings and versus the beta low saturates and trans shortening of Example 2. The bench top materials were compared with a commercial blend (Blend 1) to show that they were equivalent processes.

50 grams each of four shortening blends were made as shown below.

TABLE 1

| Component | Blend 1 | Blend 2 | Blend 3 | Blend 4 |
|---|---|---|---|---|
| Canola Oil (refined, bleached and deodorized) | 85.0 parts | 85.5 parts | 86.0 parts | 86.5 parts |
| Fully Hydrogenated Chovetta 1000 ® Palm mid fraction | 13.5 parts | 13.0 parts | 12.5 parts | 12.0 parts |
| Dimodan O emulsifier | 1.5 parts | 1.5 parts | 1.5 parts | 1.5 parts |
| Total | 100 parts | 100 parts | 100 parts | 100 parts |

Chovetta 1000® Palm mid-fraction contains 1% diglycerides, 3.9% PPP, 69.3% PSP, 19.3% PSS and 3.7% SSS. The total PSP and PSS is 88.6%. The ratio of PSP:PSS is 3.6:1. It also contains other triglycerides.

These shortening blends were then fully melted at about 150 ° F. (65 ° C.) and frozen by pouring the melted fat into a pie tin sitting in an ice bath. After allowing the sample to cool for about 3 minutes the samples were tempered at 85°

F. (29° C.) for 48 hours and then returned to 70° F. (21° C.) for 2 days. For comparison purposes a standard Crisco® shortening sample was melted and recrystallized using the above sample freezing and tempering procedure and compared to shortening frozen using normal shortening processing (i.e. similar to that described in Example 1 ). The full melting point and the onset of crystallization of each blend was measured with a Perkin Elmer DSC 4 model using a cooling and heating rate of 5° C. per minute. The shear resistance of each material was measured using a plate and cone rheometer (Bohlin Visco 88 BV) with the 5.44° cone, 0.15 mm plate and cone gap and a 17.5 sec$^{-1}$ shear rate. The higher the viscosity afar shear, the stronger and more shear resistant is the crystal structure of the shortening. The rate of crystallization at mouth temperature was measured by fully melting each sample and then placing the sample in a 92° F. (33.3° C.) bath. The % solids were measured with a Brucker low magnetic resonance unit (using the direct method of measuring solid fat content) after 15 minutes of hold time in the 92° F. (33.3° C.) bath.

TABLE 2

| Attribute | Typical β' Shortening (Crisco ®) Normal Shortening Processing | Typical β' Shortening (Crisco ®) Bench Top Processing of Example 3 | Low Saturate and Trans β Shortening Example 2 | Low Saturate and Trans β' Shortening Example 3 Blend #1 | Low Saturate and Trans β' Shortening Example 3 Blend #2 | Low Saturate and Trans β' Shortening Example 3 Blend #3 | Low Saturate and Trans β' Shortening Example 3 Blend #4 |
|---|---|---|---|---|---|---|---|
| • Saturates (grams/serving) | 3.0 | — | 2.09 | 2.29* | 2.24* | 2.19* | 2.13* |
| • Trans (grams/serving) | 1.9 | — | 0.08 | 0.15* | 0.16* | 0.16* | 0.16* |
| • Onset Of Crystallization (°F.) | 73.4°F. | — | 103.1 | 79.0°F. | — | 78.9°F. | — |
| • % Solids 15 minutes after cooling to 92° F. | 0% | — | 12.5% | 0% | — | — | — |
| • Shear Resistance - Viscosity (Pas) at shear rate of 17.5 sec$^{-1}$ | 70.1 | 72.6 | 57.4 | 108.5 | 113.0 | 108.5 | 85.3 |
| • Full Melt Point (°F.) | 122 | | 133.2 | 128.0 | — | 128.3 | — |

*Projected value if 12% nitrogen were added to the shortening

The beta shortening of Example 2 made with the blend of beta and beta prime hardstock has a high temperature at which the onset of crystallization occurs, 103° F. This means that the fat will solidify on the cooking utensils and the serving plates. This is not aesthetically pleasing. The beta prime shortening crystallizes at about the same temperature as the control product.

Second, the low saturates/low trans B' shortening of Blends 1–4, like the Crisco control, does not form solids at mouth temperature (92° F.) that lead to greasy mouthfeel whereas the B shortening forms 12% solids at mouth temperature. Third, the shear resistance (resistance to break down m performance applications such as pie crest making) is greater/superior for the B' low saturates/low trans products of Blends 1–4.

Thus, this new low saturates and low trans shortening has the melting and solidification profile of conventional shortenings but has the advantage of lower saturates and trans levels and superior shear resistance. Second it has superior melting, solidification and shear resistance to the B shortening of Example 2.

What is claimed is:

1. A non-fluid, low saturate, low trans, beta-prime stable, plastic shortening comprising from about 6% to about 25% by volume, of an inert gas and from about 60% to about 94% by volume of a fat phase consisting essentially of:

(a) from about 74% to about 90% of a base oil having from 0% to about 10% trans fatty acid isomers, and less than 16% saturated $C_4$–$C_{26}$ fatty acids;

(b) from about 10% to about 20% of a beta-prime hardstock consisting essentially of: at least 65% of PSP and PSS wherein PSP is 2-stearoyl 1,3-dipalmitin glyceride and PSS is 1-palmitoyl 2,3-distearin glyceride, and wherein the ratio of PSP:PSS is at least 0.8 to 1.0 and from 0 to 30% other triglycerides or synthetic fats and from 0 to 5% monoglycerides or diglycerides;

wherein said plastic shortening has an after shear viscosity greater than 72.6 Pas.

2. A shortening composition according to claim 1 comprising from about 25 ppm to about 500 ppm of an added antioxidant.

3. A shortening composition according to claim 2 comprising from about 1% to 8% of an emulsifer.

4. A shortening composition according to claim 2 wherein said antioxidant is selected from a group consisting of butylated hydroxytoluene, butylated hydroxyanisole, rosemary extract, tocopherols, citric acid, methyl silicone, ascorbic acid esters, ascorbic acid, ethylenediaminetetraacetic acid, tertbutyhydroquinone, ascorbyl palmitate, propyl gallate, citric acid esters or mixtures thereof.

5. A shortening composition according to claim 4 wherein the anti-oxidant is ascorbyl palmitate.

6. A shortening composition according to claim 5 wherein the emulsifier is selected from commercial grade mono- and diglycerides of soybean oil.

7. A shortening composition according to claim 1 comprising from about 1% to 8% of an emulsifier.

8. A shortening composition according to claim 7 wherein said beta prime crystalline hardstock consists essentially of from 35% to about 98% PSP.

9. A shortening composition according to claim 8 wherein said beta prime crystalline hardstock consists essentially of from about 38% to about 80% PSP.

10. A shortening composition according to claim 8 wherein said beta prime crystalline hardstock consists essentially of from about 2% to about 65% PSS.

11. A shortening composition according to claim 10 wherein said beta prime crystalline hardstock consists essentially of from about 10% to about 61% PSS.

12. A shortening composition according to claim 10 wherein said inert gas is from about 8% to about 23% by volume and is selected from a group consisting of nitrogen, argon, helium, carbon dioxide and mixtures thereof.

13. A shortening composition according to claim 12 wherein said inert gas is nitrogen and is present from about 12% to about 23% by volume.

14. A shortening composition according to claim 12 wherein said base oil is derived from the group consisting of vegetable, animal or marine oils, hydrogenated vegetable, animal or marine oils, modified vegetable oil, modified animal or marine oils, microbial oils, synthetic oils, low calorie oils, fractionated oils or mixtures thereof having less than 10% saturated fatty acids.

15. A shortening composition according to claim 14 wherein said base oil is derived from the group consisting of sunflower oil, soybean oil, olive oil, corn oil, canola oil, low linoleic canola oil, peanut oil, safflower oil, high oleic safflower oil, sunflower oil, high oleic sunflower oil and mixtures thereof.

16. A shortening composition according to claim 15 wherein said base oil is selected from the group consisting of high oleic sunflower oil, refined and bleached canola oil, and mixtures thereof.

17. A shortening composition according to claim 8 comprising from about 1% to 8% of an emulsifier.

18. A shortening composition according to claim 8 wherein said beta prime hardstock is fully hydrogenated fractionated palm oil.

19. A shortening composition according to claim 8 wherein said beat prime hardstock is selected from the group consisting of hydrogenated palm oil, hydrogenated fractionated cottonseed oil, hydrogenated Chinese vegetable tallow, hydrogenated Phulwara butter, synthetic triglycerides of palmitic and stearic acid, and mixtures thereof.

20. A shortening composition according to claim 7 wherein the said emulsifier is from about 1% to 6% of the composition, said emulsifier is selected from a group consisting of superglycerinated fat, distilled monoglycerides or mixtures thereof; said emulsifier having from about 25% by weight to about 95% by weight monoglyceride.

* * * * *